(12) United States Patent
Hong et al.

(10) Patent No.: US 9,976,082 B2
(45) Date of Patent: May 22, 2018

(54) LIQUID CRYSTAL COMPOSITION HAVING EASILY ADJUSTABLE ROTATIONAL VISCOSITY

(71) Applicant: DONGJIN SEMICHEM CO., LTD., Gyeonggi-do (KR)

(72) Inventors: Bo Ra Hong, Gyeonggi-do (KR); Sun-Hee Lee, Gyeonggi-do (KR); Mi Kyoung Lee, Gyeonggi-do (KR); Bong Hee Kim, Gyeonggi-do (KR); Young Kuk Kim, Gyeonggi-do (KR)

(73) Assignee: Dongjin Semichem Co., Ltd., Gyeonggi-do (KR)

( * ) Notice: Subject to any disclaimer, the term of this patent is extended or adjusted under 35 U.S.C. 154(b) by 0 days. days.

(21) Appl. No.: 15/380,680

(22) Filed: Dec. 15, 2016

(65) Prior Publication Data

US 2017/0096602 A1    Apr. 6, 2017

Related U.S. Application Data

(63) Continuation-in-part of application No. PCT/KR2015/006279, filed on Jun. 22, 2015.

(30) Foreign Application Priority Data

Jun. 23, 2014 (KR) .................. 10-2014-0076269

(51) Int. Cl.
    *C09K 19/30* (2006.01)
(52) U.S. Cl.
    CPC .... *C09K 19/3003* (2013.01); *C09K 2019/301* (2013.01); *C09K 2019/3004* (2013.01); *C09K 2019/3016* (2013.01); *C09K 2019/3019* (2013.01)
(58) Field of Classification Search
    CPC ........ C09K 19/3003; C09K 2019/3004; C09K 2019/301; C09K 2019/3016; C09K 2019/3019; G02F 1/1333

USPC ....................................... 252/299.63; 428/1.1
See application file for complete search history.

(56) References Cited

U.S. PATENT DOCUMENTS 7,390,538 B2 *  6/2008  Manabe ................. C09K 19/12
                                                  252/299.63

FOREIGN PATENT DOCUMENTS

| EP | 0122389 A2 | 10/1984 |
|---|---|---|
| JP | 1990-004724 A | 1/1990 |
| JP | 1993-025068 A | 2/1993 |
| KR | 10-2006-0041219 A | 5/2006 |
| KR | 10-2008-0084851 A | 9/2008 |
| KR | 10-2011-0055314 A | 5/2011 |
| KR | 10-2011-0063271 A | 6/2011 |

* cited by examiner

*Primary Examiner* — Geraldina Visconti
(74) *Attorney, Agent, or Firm* — Hultquist, PLLC; Steven J. Hultquist

(57) ABSTRACT

The present invention provides a liquid crystal composition having easily adjustable rotational viscosity while maintaining stability at low temperature, a clearing point and dielectric anisotropy (positive value) in an optimal condition according to an exemplary embodiment of the present invention, including: at least one liquid crystal compound selected from the group consisting of liquid crystal compounds represented by the following Chemical Formula 1, as a first component; at least one liquid crystal compound selected from the group consisting of liquid crystal compounds represented by the following Chemical Formula 2, as a second component; and at least one liquid crystal compound selected from the group consisting of liquid crystal compounds represented by the following Chemical Formula 3, as a third component.

The liquid crystal composition according to the present invention has high clearing point and refractive index anisotropy, a controllable modulus of elasticity, and high specific resistance, and the rotational viscosity thereof is easily adjustable to be low. Thus, the liquid crystal composition satisfying various liquid crystal display (LCD) device characteristics is provided.

20 Claims, No Drawings

LIQUID CRYSTAL COMPOSITION HAVING EASILY ADJUSTABLE ROTATIONAL VISCOSITY

CROSS-REFERENCE TO RELATED APPLICATIONS

This is a continuation-in-part application under 35 U.S.C. § 120 of International Patent Application No. PCT/KR2015/006279 filed Jun. 22, 2015, which in turn claims priority of Korean Patent Application No. 10-2014-0076269 filed Jun. 23, 2014. The disclosures of such international patent application and Korean priority patent application are hereby incorporated herein by reference in their respective entireties, for all purposes.

FIELD OF THE INVENTION

The present invention relates to a liquid crystal composition having easily adjustable rotational viscosity, appropriate for a matrix liquid crystal (MLC) display, and more particularly, to a liquid crystal composition having positive dielectric anisotropy, which is related to a device using a positive liquid crystal such as a twist nematic (TN) mode and an in-plane switching (IPS) mode. In particular, the present invention relates to a liquid crystal applicable to an active matrix-liquid crystal display (AM-LCD) requiring high specific resistance.

BACKGROUND ART

There are various kinds of liquid crystal display (LCD) such as TN, STN, IPS and FFS, depending on the characteristics of an LCD panel and a voltage application mode, and the liquid crystal display is prepared usually by combining 7-20 kinds of single liquid crystal compounds, since it is impossible with one or two materials to adapt the characteristics thereof to those required for a product such as temperature of a clearing point, dielectric anisotropy, refractive index anisotropy and rotational viscosity. The characteristics required for this liquid crystal composition are as follows:

TABLE 1

Characteristics of liquid crystal mixture required for LCD

| Characteristics of liquid crystal mixture | Characteristic values | Remarks | Device parameter change due to liquid crystal |
|---|---|---|---|
| Stability at low temperature (° C.) | −20° C. or less | smaller the better characteristic | operating temperature |
| Clearing point (° C.) | 70° C. or more | larger the better characteristic | operating temperature |
| Dielectric anisotropy (positive value) | 2 or more | larger the better characteristic | threshold voltage, response time |
| Refractive index anisotropy | 0.07 or more | varied with a device | luminance |
| Rotational viscosity (mPas) | as low as possible | smaller the better characteristic | response time |
| Modulus of elasticity (average value of $K_{11}$, $K_{22}$, $K_{33}$) | 8~18 pN | varied with a device | response time, threshold voltage, luminance |

A single liquid crystal compound forming this liquid crystal composition is an organic material having a molecular weight of 200-600, which has a molecular structure of a long bar shape. The structure of the single liquid crystal compound is divided into a core group maintaining straightness, a terminal group having flexibility, and a linkage group for a specific use. The terminal portion includes an easily bendable chain form (alkyl, alkoxy, alkenyl) at one or both ends to maintain flexibility, and a polar group (F, CN, $OCF_3$, etc.) introduced at the other end to serve to adjust the physical properties of a liquid crystal such as a dielectric constant.

As it has been several decades since a single liquid crystal compound applied to a liquid crystal display (LCD) technology was developed, various forms of single liquid crystal compound are being prepared, and liquid crystal compositions are being prepared by combining these single liquid crystal compounds, however, there is still a continuous demand for a liquid crystal composition having best performance of a liquid crystal display (LCD).

As a single liquid crystal compound related to the present invention, a fluorine-substituted terphenyl compound of Chemical Formula 1 is disclosed in Japanese Patent Laid-Open Publication No. 1993-025068, a representative non-polar liquid crystal compound having two cyclohexanes linked to each other is disclosed in European Patent Application Publication No. 0122389, and a plurality of fluorine-substituted liquid crystal compound being advantageous for improving dielectric anisotropy are disclosed in Japanese Patent Laid-Open Publication No. 1990-004724; however, only the properties of each liquid crystal compound are known in the art, and a formulation technique for a liquid crystal composition having easily adjustable rotational viscosity while maintaining other performance in an optimal condition, under complex interactions of stability at low temperature, a clearing point, dielectric anisotropy (positive value) and rotational viscosity adjustment, in recently commercialized various liquid crystal displays (LCD), is not known in the art.

SUMMARY OF THE INVENTION

The present invention is directed to providing a liquid crystal composition having easily adjustable rotational viscosity while maintaining stability at low temperature, a clearing point and dielectric anisotropy (positive value) in an optimal condition, and thus, a liquid crystal composition satisfying various liquid crystal display (LCD) device characteristics.

A liquid crystal composition having easily adjustable rotational viscosity while maintaining stability at low temperature, a clearing point and dielectric anisotropy (positive value) in an optimal condition according to an exemplary embodiment of the present invention includes: at least one liquid crystal compound selected from the group consisting of liquid crystal compounds represented by the following Chemical Formula 1, as a first component; at least one liquid crystal compound selected from the group consisting of liquid crystal compounds represented by the following Chemical Formula 2, as a second component; and at least one liquid crystal compound selected from the group consisting of liquid crystal compounds represented by the following Chemical Formula 3, as a third component.

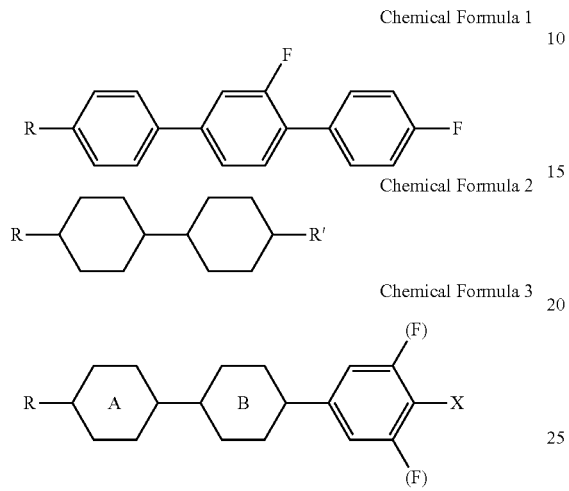

Chemical Formula 1

Chemical Formula 2

Chemical Formula 3 wherein R and R' are independently of each other alkyl having 1 to 12 carbon atoms, alkenyl having 2 to 12 carbon atoms and alkoxy having 1 to 12 carbon atoms; X is F, $CF_3$, $OCF_3$ or $OCF_2CF=CF_2$; and hexacycles A and B are independently of each other the following groups:

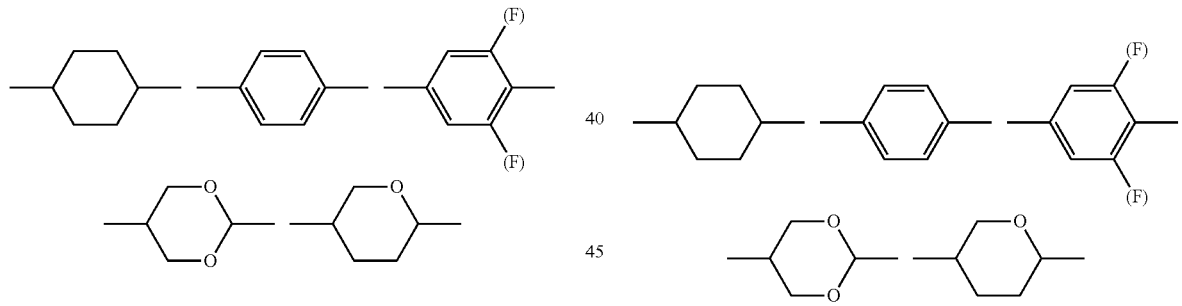

Hexacycles A and B independently of each other refer to independently of each other cyclohexyl, phenyl, fluorinated phenyl or a ring compound having 1 or 2 $CH_2$ unit replaced with oxygen in cyclohexyl.

A symbol of (F) in the above refers to fluorine attached to phenyl ring. Namely, hydrogen or fluorine atom (F) is attached at the (F) position of carbon of the hexacycles.

The liquid crystal compounds of Chemical Formulae 1 to 3 may serve to complement the physical properties in a trade-off relationship such as dielectric anisotropy, refractive index anisotropy, rotational viscosity and a clearing point when preparing a liquid crystal composition useful for LCD.

The characteristic values of the representative compounds of Chemical Formulae 1 to 3 are shown in the following Table 2. The characteristics of the individual single liquid crystal compound on the liquid crystal composition, shown in Table 2, are as follows:

The first component increases refractive index anisotropy and dielectric anisotropy, and has low viscosity. In addition, it has high modulus of elasticity, and thus, is particularly useful for an IPS or FFS mode requiring this. In the present invention, it was deduced that the first component represents high modulus of elasticity while maintaining similar dielec-

DETAILED DESCRIPTION OF THE EMBODIMENTS

Unless otherwise defined, all technical and scientific terms used herein have the same meaning as commonly understood by a person skilled in the art to which the present invention pertains. In general, the terminology used herein is well-known and commonly used in the art.

The present invention provides a liquid crystal composition having easily adjustable rotational viscosity while maintaining stability at low temperature, a clearing point, dielectric anisotropy (positive value) in an optimal condition.

The present invention relates to a liquid crystal composition including: at least one liquid crystal compound selected from the group consisting of liquid crystal compounds represented by the following Chemical Formula 1, as a first component; at least one liquid crystal compound selected from the group consisting of liquid crystal compounds represented by the following Chemical Formula 2, tric anisotropy, or easily improves rotational viscosity to be advantageous for a response speed.

The second component has low viscosity, and adjusts refractive index anisotropy and dielectric anisotropy.

The third component increases the insufficient clearing point and dielectric constant of the compounds of Chemical Formulae 1 and 2, or appropriately adjusts refractive index anisotropy.

order to adapt the characteristics of the composition including the first to third components to those required for the LCD, and the fourth and fifth components are as follows:

The fourth component increases dielectric anisotropy.

The fifth component raises the temperature of a clearing point, and if required, optimizes refractive index anisotropy.

TABLE 2

| Characteristic values of the representative compounds among the compounds of Chemical Formulae 1 to 3 | | | | | | | |
|---|---|---|---|---|---|---|---|
| | | Physical properties of single liquid crystal compound | | | | | |
| Compound No. | Molecular structure | Clearing point | Dielectric anisotropy | Refractive index anisotropy | Rotational viscosity | $K_{11}$ | $K_{33}$ |
| 1-2 | | 111 | 10 | 0.25 | 118 | 13.4 | 18.0 |
| 2-1 | | 42 | −0.5 | 0.04 | 18 | 10.0 | 15.5 |
| 3-1-1 | | 48 | 20 | 0.21 | 156 | 14.5 | — |
| 3-3-1 | | 86 | 10 | 0.07 | 171 | 11.0 | 13.0 |
| 3-4 | | 139 | 6 | 0.10 | 142 | 14.0 | 17.6 |

Note:
Clearing point, dielectric anisotropy, refractive index anisotropy and rotational viscosity are 10% extrapolation values, and $K_{11}$ and $K_{33}$ are the values of a host 10% mixture.

Further, the present invention may selectively include at least one or more of the fourth component of Chemical Formula 4 or the fifth component of Chemical Formula 5, in Chemical Formula 4

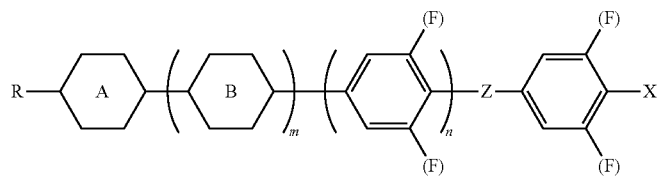

Chemical Formula 5

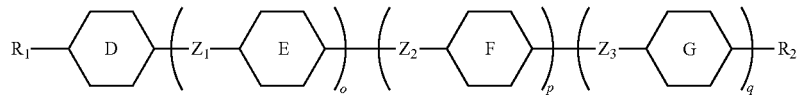

wherein R, $R_1$, $R_2$ are independently of each other alkyl having 1 to 12 carbon atoms, alkenyl having 2 to 12 carbon atoms and alkoxy having 1 to 12 carbon atoms; X is F, $CF_3$, $OCF_3$ or $OCF_2CF=CF_2$; and Z, $Z_1$, $Z_2$ and $Z_3$ are a single bond, $CF_2O$, $CH_2CH_2$, COO or $CF_2CF_2$; and o, p and q are independently of each other integer between 0 to 2. In Chemical Formula 4, when Z is a single bond and m=1, n is not 0, and m+n≤3, and when Z is not a single bond, m and n are 0 or 1, respectively, and m+n≠0. In Chemical Formula 5, when $Z_1$, $Z_2$ and $Z_3$ are a single bond, o=0 or 1, p=1 or 2, and q=1 or 2. Hexacycles A, B, D, E, F and G are independently of each other the following groups:

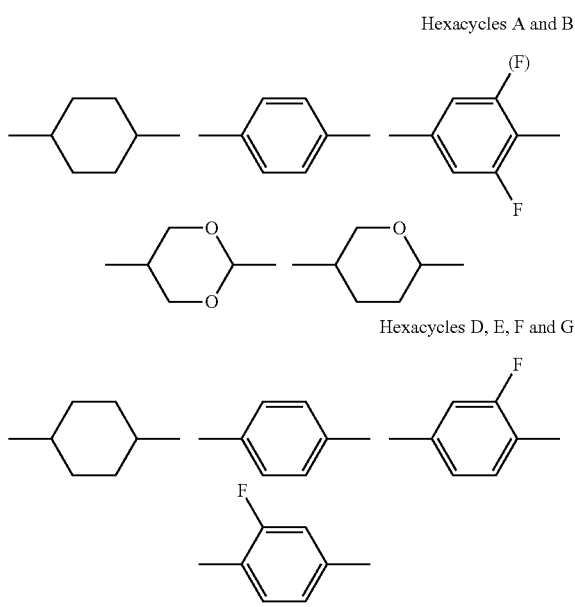

The fourth and fifth components are used in order to adjust the threshold voltage and phase difference which is the main characteristics of the LCD. Particularly, the fourth component is advantageous for adjusting dielectric anisotropy to be a large the better characteristic. The fifth component varies refractive index anisotropy depending on the number of a phenyl group, and is a material required for optimizing a phase difference (cell gap X refractive index anisotropy) which is a required property for an LCD device.

Hereinafter, the combination of the components and the critical ranges of the component liquid crystal compounds in the liquid crystal composition of the present invention will be described in detail:

The preferred combinations of the liquid crystal composition of the present invention are as follows:

a liquid crystal composition including first component+ second component+third component a liquid crystal composition including first component+ second component+third component+fourth component a liquid crystal composition including first component+ second component+third component+fourth component+ fifth component The first component is included at 3 wt % to 30 wt %, and 3 wt % to 10 wt % is preferred for maintaining low rotational viscosity, considering stability at low temperature and refractive index anisotropy.

The second component is an important constituent for maintaining low viscosity, and included at 10 wt % to 80 wt % considering response characteristics and 30 wt % to 50 wt % is preferred considering dielectric anisotropy and refractive index anisotropy.

The third component is a component required for increasing dielectric anisotropy and a clearing point, and included at 3 wt % to 80 wt %, preferably at 10 wt % to 50 wt %.

One aspect of the present invention is a liquid crystal composition which may have low rotational viscosity, while having a clearing point, dielectric anisotropy and refractive index anisotropy suitable for each liquid crystal display driving mode, that is, may adjust rotational viscosity to be low while optimizing other characteristic values of the liquid crystal composition, when including the first component in a range of 3 wt % to 10 wt %, even in the case of adjusting the total content of the first to third components to be 50 wt % to 90 wt % and applying it.

The fourth component which is selectively further included is suitable for increasing anisotropy or a clearing point, and included at 3 wt % to 70 wt %.

The fifth component is a material required for increasing a clearing point and adjusting refractive index anisotropy, and used at 3 wt % to 70 wt %.

The preferred liquid crystal compound of the present invention will be described.

The liquid crystal compound of the first component is represented by Chemical Formulae 1-1-0 to 1-3-0, and considering stability at low temperature and rotational viscosity, the compounds of Chemical Formulae 1-1-0 and 1-2-0 are more preferred.

The preferred second component is the liquid crystal compounds of Chemical Formulae 2-1-0 to 2-5-0, and the compound of Chemical Formula 2-1-0 is useful for low viscosity, and the compounds of Chemical Formulae 2-2-0 and 2-3-0 are useful for increasing a modulus of elasticity.

As the third component, the compounds of Chemical Formulae 3-1-0 to 3-4-0 are preferred, and particularly the compound of Chemical Formula 3-1-0 is useful for increasing dielectric anisotropy, and the compound of Chemical Formula 3-3-3 or 3-3-4 is useful for increasing a modulus of elasticity. Further, the compound of Chemical Formula 3-4-0 is preferred for improving a clearing point.

As the fourth component, the compounds of Chemical Formulae 4-2-1 to 4-6-1 are preferred, and the compound of Chemical Formula 4-2-1 or 4-2-2 is useful for improving a clearing point, and the compound of Chemical Formula 4-3-1 or 4-3-2 is preferred for improving dielectric anisotropy.

As the fifth component, the compounds of Chemical Formulae 5-1-0 to 5-3-0 are useful, and used to improve refractive index anisotropy and a clearing point.

Chemical Formula 1-1-0

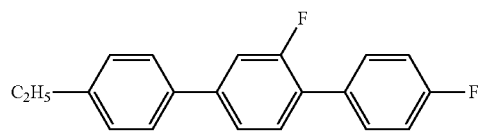

Chemical Formula 1-2-0

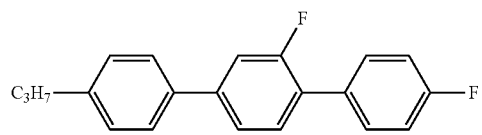

Chemical Formula 1-3-0
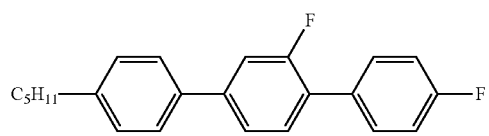
Chemical Formula 2-1-0
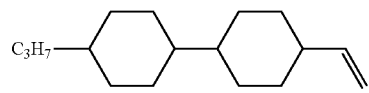
Chemical Formula 2-2-0
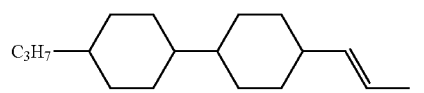
Chemical Formula 2-3-0
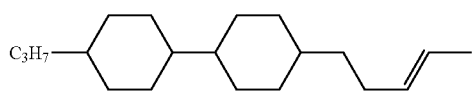
Chemical Formula 2-4-0
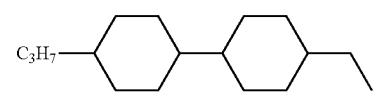
Chemical Formula 2-5-0
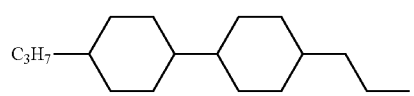
Chemical Formula 3-1-0
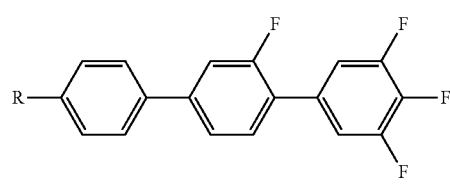
Chemical Formula 3-2-1
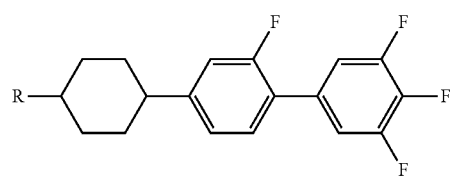
Chemical Formula 3-2-2
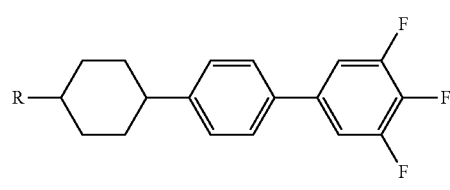
Chemical Formula 3-3-1
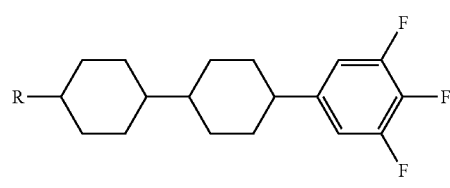
Chemical Formula 3-3-2
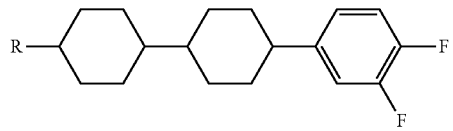
Chemical Formula 3-3-3
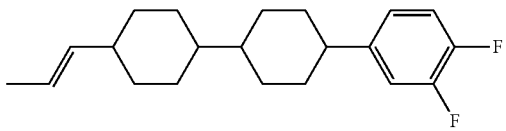
Chemical Formula 3-3-4
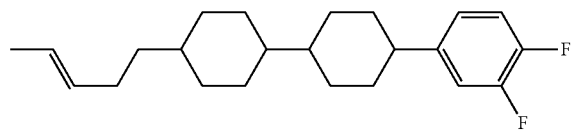
Chemical Formula 3-4-0
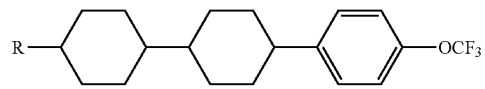
Chemical Formula 4-2-1
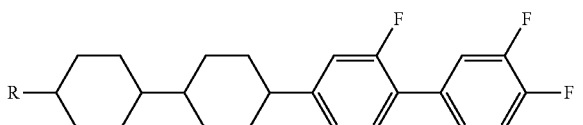
Chemical Formula 4-2-2
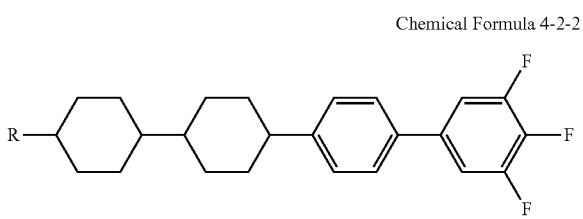
Chemical Formula 4-3-1
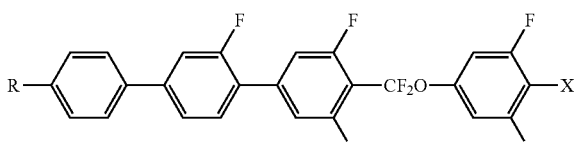
Chemical Formula 4-3-2
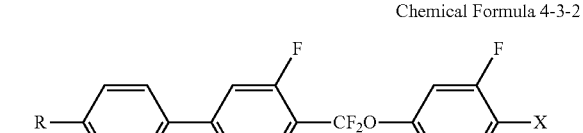
Chemical Formula 4-4-1
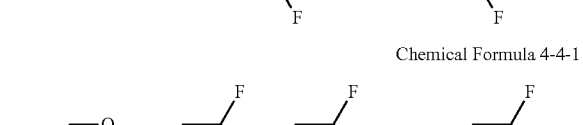
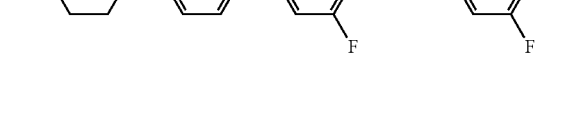

Chemical Formula 4-6-1

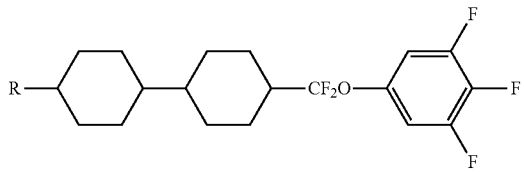

Chemical Formula 5-1-0

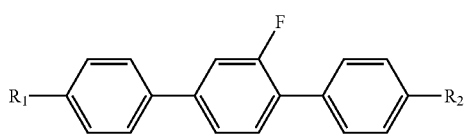

Chemical Formula 5-2-0

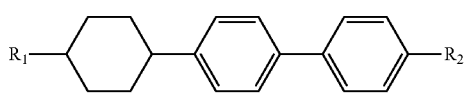

Chemical Formula 5-3-0

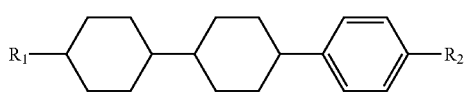

wherein R, $R_1$, $R_2$ are independently of each other alkyl having 1 to 12 carbon atoms, alkenyl having 2 to 12 carbon atoms and alkoxy having 1 to 12 carbon atoms; and X is F, $CF_3$, $OCF_3$ or $OCF_2CF\!=\!CF_2$.

The present invention relates to a liquid crystal composition having easily adjustable rotational viscosity, appropriate for a matrix liquid crystal (MLC) display. Particularly, the present invention relates to a liquid crystal composition having positive dielectric anisotropy, which is advantageous for a device using a positive liquid crystal such as a twist nematic (TN) mode and an in-plane switching (IPS) mode. A backlight used in this mode may produce heat and UV to give damage, and thus, some practical products may have unsuitable characteristics. Therefore, since thermal and optical stability for maintaining high specific resistance without being damaged from heat and UV required in an LCD mode using the positive liquid crystal is important, at least one compound selected from the group consisting of the compounds of Chemical Formulae 6 to 8 which are an antioxidant or UV stabilizer of the mixture may be added at 0 ppm to 2000 ppm individually. Preferably, 200 ppm to 300 ppm are appropriate independently/selectively, and in Chemical Formula 6, $R_3$ is preferably $C_7H_{15}$, and in Chemical Formulae 7 and 8, $R_4$ and $R_5$ are hydrogen or an alkyl chain having 1 to 12 carbon atoms, and preferably hydrogen or $CH_3$, which minimizes the change of liquid crystal physical properties. In Chemical Formula 7, x is 1 to 12 and in Chemical Formula 8, y is 0 to 12.

Chemical Formula 6

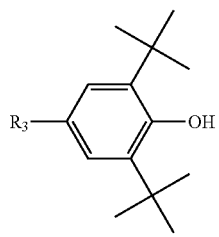

Chemical Formula 7

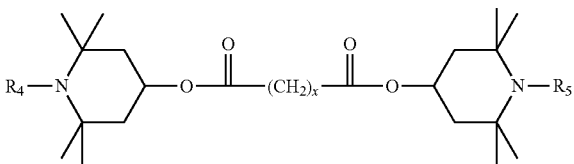

Chemical Formula 8

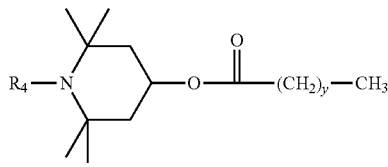

Further, in the case of imparting a helical structure of a liquid crystal mixture as in STN and TN, a chiral dopant such as a compound of Chemical Formula 9 is added at 0.01 wt % to 5 wt %, thereby fitting a desired pitch.

Chemical Formula 9

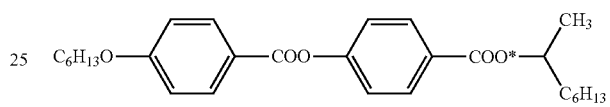

Hereinafter, the present invention will be described in more detail by the following Examples. These Examples are provided only to illustrate the present invention, and it will be evident to a person skilled in the art that the scope of the present invention is not construed to be limited to those Examples.

EXAMPLES

In the Examples of the present invention, the numerical value is expressed by wt %, and unless otherwise stated, a dielectric constant, a refractive index, rotational viscosity and a modulus of elasticity were measured at 20° C. Each physical property was measured as follows:

The clearing point was measured by putting a specimen into an apparatus with a temperature regulator, and observing the clearing point while raising the temperature at a rate of 3° C./min.

The dielectric anisotropy was measured by injecting the liquid crystal of the Example into the specimens of 4 μm horizontal alignment ($\in_\perp$) and a vertical alignment ($\in_\parallel$), and then determining each dielectric constant at 1 kHz and 0.3 V, and calculating the dielectric anisotropy ($\Delta\in=\in_\parallel-\in_\perp$) therefrom.

The refractive index anisotropy was measured by using an Abbe refractometer at 589 nm, in which lecithin was used to align the liquid crystal, and then a normal refractive index (no) and an abnormal refractive index (ne) were determined to calculate the refractive index anisotropy ($\Delta n=ne-no$).

The rotational viscosity was measured by determining a peak time of a transient current and a peak current.

The modulus of elasticity was measured by injecting the liquid crystal into a 25 μm horizontal specimen, and then observing electric capacity change while voltage was applied from 0 V to 20 V.

Unless otherwise stated in the Examples, the measurement was carried out without other additives except the liquid crystal, and the material names included in the composition were designated as the following symbols: The designation method is shown in the following Table 3:

TABLE 3

Designation method of the single liquid crystal compound used in the Examples

| Core group | | Linkage group | | Terminal group | | | |
|---|---|---|---|---|---|---|---|
| Structure | Symbol | Structure | Symbol | Structure | Symbol | Structure | Symbol |
| (phenyl) | A | (difluoro phenyl) F,F | E | —CF$_2$O— | X | —C$_n$H$_{2n+1}$ | n (number) | (OK structure) | OK |
| (cyclohexyl) | B | (difluoro phenyl) F,F | F | —CH$_2$CH$_2$— | N | —O—C$_n$H$_{2n+1}$ | On | —OCF$_3$ | OCF3 |
| (F-phenyl) | C | (dioxane) | I | —COO— | L | —CH=CH$_2$ | V | —F | F |
| (F-phenyl) | D | (pyran) | Ia | | | —CH=CH—CH$_3$ | U1 | —CF$_3$ | CF3 |
| | | | | | | —CH$_2$—CH=CH—CH$_3$ | 3=2 | —CN | CN |
| | | | | | | —CH$_2$—CH=CH—CH$_2$— | W | | | e.g.
(No additional indication between the core group and the linkage group)
(The core/linkage group and the terminal group are distinguished by "-".
The terminals are distinguished by "•", and the terminal was written at the end.)

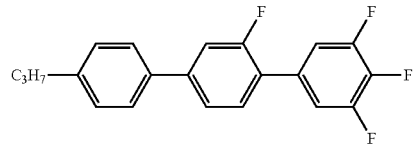

ACE-3.F

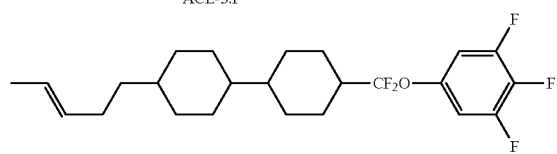

BBXE-3=2.F

Examples of IPS liquid crystal composition

The following is the Examples of an IPS liquid crystal composition requiring a liquid crystal composition having high modulus of elasticity. Comparative Examples 1-1 and 1-2 are those including no first component of the present invention, and Examples 1-1 to 1-4 are those including 4.8 wt % to 9.0 wt % of the first component of the present invention. Comparing the Examples with the Comparative Example, it is recognized that the liquid crystal composition of the present invention has lower rotational viscosity at similar dielectric anisotropy and modulus of elasticity to those of the Comparative Examples.

TABLE 4

Examples of IPS liquid crystal composition

| Classification | | Code | Comp. Ex. 1-1 | Ex. 1-1 | Ex. 1-2 | Ex. 1-3 | Ex. 1-4 |
|---|---|---|---|---|---|---|---|
| Composi- tional ratio | First component | ACA-2.F | | 5.7 | 5.2 | 4.8 | 2.5 |
| | | ACA-3.F | | | | | 6.5 |
| | Second component | BB-3.V | 16.6 | 17.3 | 25.0 | 38.8 | 36.8 |
| | | BB-3.U1 | 6.3 | 7.0 | 8.2 | 3.8 | 6.1 |
| | Third | ACE-2.F | | | | | 4.8 |

TABLE 4-continued

Examples of IPS liquid crystal composition

| Classification | Code | Comp. Ex. 1-1 | Ex. 1-1 | Ex. 1-2 | Ex. 1-3 | Ex. 1-4 |
|---|---|---|---|---|---|---|
| component | BAC-3.F | 6.5 | 4.8 | 6.6 | 2.9 | |
| | BAE-3.F | 2.3 | | | | |
| | BCE-2.F | | 6.0 | | 5.0 | |
| | BCE-3.F | | 6.0 | | | |
| | BBA-3.OCF3 | 3.2 | 2.0 | 2.8 | 1.2 | 11.6 |
| | BBE-2.F | 16.3 | 5.4 | 5.1 | | |
| | BBE-3.F | 10.4 | 5.4 | | | |
| | BBC-V.F | 10.8 | 7.5 | 9.3 | 4.3 | |
| | BBC-U1.F | | | | | |
| Fourth component | BAC-3 = 2.F | | | | | 7.0 |
| | BBAC-3.F | | | | 9.2 | |
| | BBCE-3.F | | | | | |
| | ACEXE-2.OK | | | 5.2 | 5.0 | 5.0 |
| | ACEXE-3.OK | | | | | 5.0 |
| | IaCEXE-3.OK | | | 5.2 | 5.3 | |
| Fifth component | ACA-2.3 | | 1.4 | | | 3.5 |
| | ACA-3.3 | | | | | 4.0 |
| | BAA-3.2 | 14.3 | | | | |
| | BAA-5.2 | 13.3 | | | | |
| | BBA-V.1 | | 18.4 | 17.2 | 12.4 | 4.0 |
| | BBA-3.1 | | | | | 3.2 |
| | BBA-W.1 | | 13.1 | 10.2 | 7.3 | |
| Physical properties | Clearing point | 98.6 | 98.8 | 104.1 | 103.4 | 91.5 |
| | Refractive index anisotropy | 0.1036 | 0.1032 | 0.1015 | 0.1016 | 0.1172 |
| | Dielectric anisotropy | 4.3 | 4.0 | 4.1 | 4.0 | 4.9 |
| | Rotational viscosity | 89 | 79 | 74 | 62 | 74 |
| | Modulus of elasticity $K_{11}$ | 12.6 | 9.5 | 9.2 | 8.5 | 15.5 |
| | Modulus of elasticity $K_{33}$ | 15.1 | 20.0 | 24.3 | 22.8 | 17.1 |
| | Sum of moduli of elasticity ($K_{11+33}$) | 27.7 | 29.5 | 33.5 | 31.3 | 32.6 |

Examples of liquid crystal composition requiring low viscosity

The following is the Examples of the liquid crystal composition requiring low viscosity and an appropriate modulus of elasticity. Comparative Example 2-1 is that including no first component of the present invention, and Examples 2-1 to 2-5 are those including the first component of the present invention. Comparing the Examples with the Comparative Example, it is recognized that the liquid crystal composition of the present invention reduces rotational viscosity at similar dielectric anisotropy, as compared with those of the Comparative Examples.

TABLE 5

Examples of liquid crystal composition requiring low viscosity

| Classification | | Code | Comp. Ex. 2-1 | Ex. 2-1 | Ex. 2-2 | Ex. 2-3 | Ex. 2-4 | Ex. 2-5 |
|---|---|---|---|---|---|---|---|---|
| Compositional ratio | First component | ACA-2.F | | 5.8 | 3.8 | 4.0 | | |
| | | ACA-3.F | | 5.0 | 4.2 | 4.4 | 7.5 | 6.0 |
| | Second component | BB-3.V | 28.7 | 35.0 | 34.8 | 34.9 | 35.2 | 35.2 |
| | | BB-3.U1 | 9.0 | 4.0 | 6.6 | 6.6 | 5.2 | 5.2 |
| | Third component | ACE-2.F | 3.6 | 4.5 | 4.2 | 4.2 | 5.0 | 5.5 |
| | | ACE-3.F | 4.1 | 3.6 | 5.9 | 5.9 | 4.0 | 4.5 |
| | | BAC-3.F | | | | | | |
| | | BCE-2.F | 5.7 | 3.5 | | | 3.5 | 4.0 |
| | | BCE-3.F | 5.2 | 3.0 | 5.5 | 5.5 | 3.5 | 3.5 |
| | | BBA-3.OCF3 | 7.8 | 10.0 | 11.3 | 11.3 | 12.5 | 12.5 |
| | | BBE-2.F | 7.3 | 3.7 | 4.7 | 4.7 | | |
| | | BBE-3.F | 8.9 | 10.0 | 8.5 | 8.0 | 12.2 | 12.2 |
| | Fourth component | BBAE-3.F | | | | | | 2.3 |
| | | BBCE-3.F | 5.7 | 4.9 | 6.0 | 6.0 | 6.8 | 4.0 |
| | Fifth component | ACA-2.3 | 3.9 | | | | | |
| | | ACA-3.3 | | | | | | |
| | | BAA-3.2 | 10.1 | | 1.8 | 1.8 | 4.6 | 5.1 |
| | | BAA-5.2 | | | | | | |
| | | BBA-V.1 | | | | | | |
| | | BBA-3.1 | | 7.0 | 2.7 | 2.7 | | |
| | | BBA-W.1 | | | | | | |

TABLE 5-continued

Examples of liquid crystal composition requiring low viscosity

| Classification | Code | Comp. Ex. 2-1 | Ex. 2-1 | Ex. 2-2 | Ex. 2-3 | Ex. 2-4 | Ex. 2-5 |
|---|---|---|---|---|---|---|---|
| Physical properties | Clearing point | 80.5 | 80.2 | 79.9 | 80.0 | 80.4 | 80.0 |
| | Refractive index anisotropy | 0.1028 | 0.1025 | 0.1019 | 0.1025 | 0.103 | 0.1024 |
| | Dielectric anisotropy | 6.2 | 6.2 | 6.2 | 6.2 | 6.2 | 6.3 |
| | Rotational viscosity | 79 | 69 | 75 | 75 | 74 | 73 |

Examples of the liquid crystal composition having high refractive index anisotropy The following is the Examples of the liquid crystal composition having high refractive index anisotropy. Comparative Example 3-1 is that including no first component of the present invention, and Examples 3-1 to 3-2 are those including the first component of the present invention. From the Examples and the Comparative Example, it is recognized that the liquid crystal composition of the present invention increases refractive index anisotropy and reduces rotational viscosity at similar dielectric anisotropy, as compared with those of the Comparative Examples.

TABLE 6

Examples of the liquid crystal composition having high refractive index anisotropy

| Classification | Code | Comp. Ex. 3-1 | Ex. 3-1 | Ex. 3-2 |
|---|---|---|---|---|
| Compositional ratio | First component | | | |
| | ACA-2.F | | | 5.4 |
| | ACA-3.F | | 6.9 | 6.3 |
| | Second component | | | |
| | BB-3.V | 29.8 | 25.4 | 31.3 |
| | BB-3.U1 | 7.8 | 5.2 | 13.4 |
| | Third component | | | |
| | ACE-2.F | 5.5 | 6.9 | 6.3 |
| | ACE-3.F | 4.7 | 7.2 | 6.3 |
| | ACE-5.F | | | 2.7 |
| | BAA-3.F | 5.5 | 6.2 | |
| | BAC-3.F | 3.9 | 6.2 | |
| | BAE-3.F | 5.5 | | |
| | BBAE-3.F | 4.7 | | 3.6 |
| | BBCE-3.F | | 3.9 | 3.6 |
| | Fourth component | | | |
| | AEXE-2.F | 9.4 | 4.6 | 5.4 |
| | AEXE-3.F | 3.1 | 4.6 | 5.4 |
| | BBXE-3.F | | | |
| | AANA-3.F | 6.3 | 7.8 | |
| | AANA-5.F | | 7.8 | |
| | Fifth component | | | |
| | ACA-2.3 | 6.7 | | 5.4 |
| | ACA-3.3 | | | 5.4 |
| | BAA-3.2 | 7.1 | | |
| | BAA-5.2 | | | |
| | BBA-V.1 | | 3.9 | |
| | BBA-3.1 | | 3.9 | |
| | BBA-W.1 | | | |
| Physical properties | Clearing point | 74.0 | 77.2 | 70.8 |
| | Refractive index anisotropy | 0.1292 | 0.1368 | 0.1346 |
| | Dielectric anisotropy | 7.5 | 7.4 | 7.3 |
| | Rotational viscosity | 78 | 71 | 70 |

INDUSTRIAL APPLICABILITY

The liquid crystal composition according to the present invention has a high clearing point and refractive index anisotropy, a controllable modulus of elasticity, and high specific resistance, and the rotational viscosity thereof is easily adjustable to be low. Thus, the liquid crystal composition satisfying various liquid crystal display (LCD) device characteristics is provided.

The invention claimed is:

1. A liquid crystal composition comprising:
at least one liquid crystal compound selected from the group consisting of liquid crystal compounds represented by Chemical Formula 1, as a first component;
at least one liquid crystal compound selected from the group consisting of liquid crystal compounds represented by Chemical Formula 2, as a second component; and
at least one liquid crystal compound selected from the group consisting of liquid crystal compounds represented by Chemical Formula 3, as a third component:

Chemical Formula 1

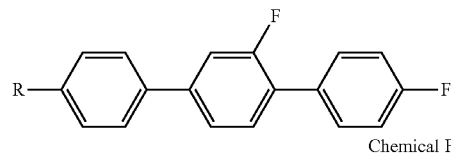

Chemical Formula 2

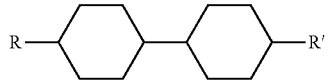

Chemical Formula 3

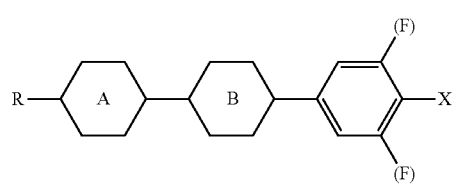

wherein R and R' are independently of each other alkyl having 1 to 12 carbon atoms, alkenyl having 2 to 12 carbon atoms or alkoxy having 1 to 12 carbon atoms; X is F, $CF_3$, $OCF_3$ or $OCF_2CF=CF_2$; and hexacycles A and B are independently of each other the following groups: hexacycles A and B are independently of each other cyclohexyl, phenyl, fluorinated phenyl or a ring compound having 1 or 2 $CH_2$ unit replaced with oxygen in cyclohexyl and are selected from following groups:

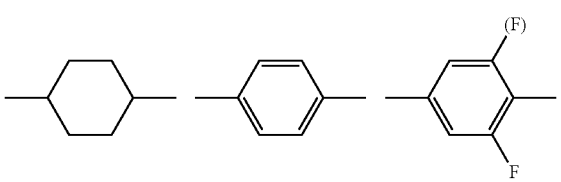

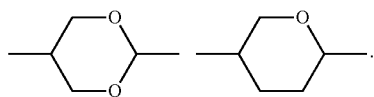

2. The liquid crystal composition of claim 1, wherein the first component is at least one compound selected from the group consisting of compounds represented by Chemical Formulae 1-1 to 1-3, the second component is at least one compound selected from the group consisting of compounds represented by Chemical Formulae 2-1 to 2-5, and the third component is at least one compound selected from the group consisting of compounds represented by Chemical Formulae 3-1 to 3-4:

Chemical Formula 1-1

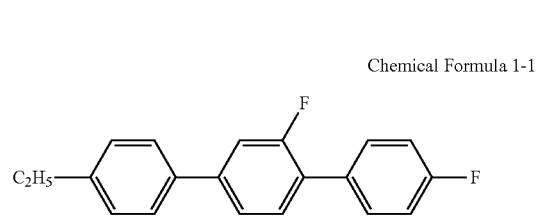

Chemical Formula 1-2

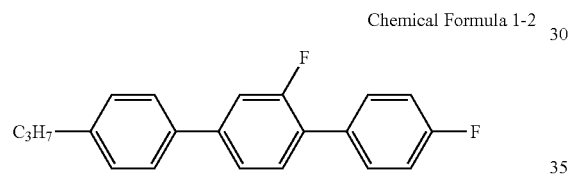

Chemical Formula 1-3

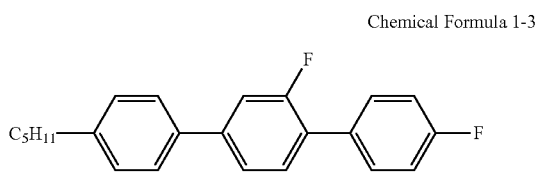

Chemical Formula 2-1

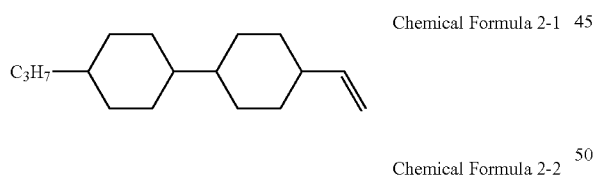

Chemical Formula 2-2

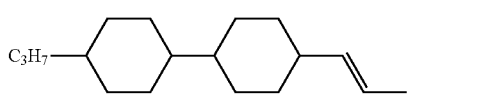

Chemical Formula 2-3

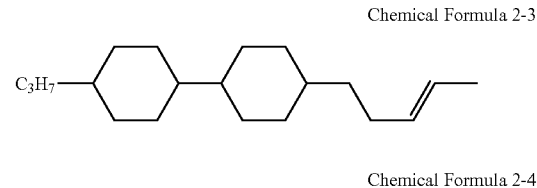

Chemical Formula 2-4

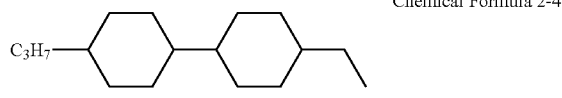

Chemical Formula 2-5

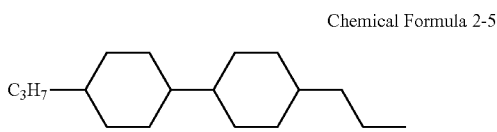

Chemical Formula 3-1

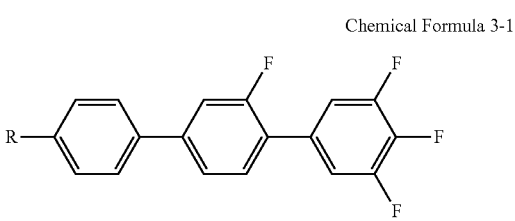

Chemical Formula 3-2

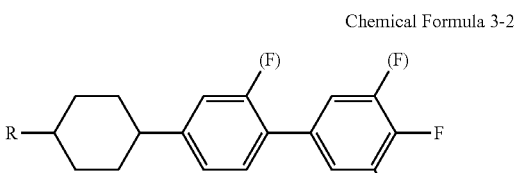

Chemical Formula 3-3

Chemical Formula 3-4

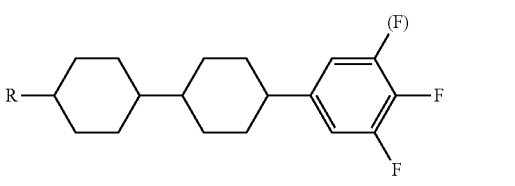

wherein R is same as claim 1.

3. The liquid crystal composition of claim 2, wherein the first component is at least one compound selected from the group consisting of compounds represented by Chemical Formulae 1-1 and 1-2, the second component is at least one compound selected from the group consisting of compounds represented by Chemical Formulae 2-1 and 2-2, and the third component is represented by Chemical Formula 3-4.

4. The liquid crystal composition of claim 1, wherein the first component is in amount of 3 wt % to 30 wt %, the second component is in amount of 10 wt % to 80 wt, and the third component is in amount of 3 wt % to 80 wt %, based on total weight of the liquid crystal composition.

5. The liquid crystal composition of claim 1, wherein the first component is in amount of 3 wt % to 10 wt %, the second component is in amount of 10 wt % to 80 wt, the third component is in amount of 3 wt % to 80 wt %, and total weight of the first component and the third component is 50 wt % to 90 wt %, based on total weight of the liquid crystal composition.

6. The liquid crystal composition of claim 1, further comprising a compound represented by Chemical Formula 4, as a fourth component:

Chemical Formula 4

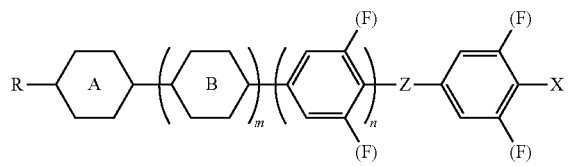

wherein R and X are same as claim 1; Z is a single bond, CF$_2$O, CH$_2$CH$_2$, COO or CF$_2$CF$_2$, when Z is a single bond, and m=1, n is not 0, and m+n≤3, and when Z is not a single bond, m and n are 0 or 1, respectively, and m+n≠0; hexacycles A and B are independently of each other following groups:

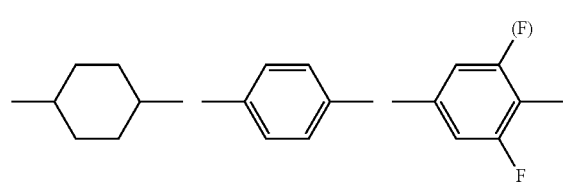

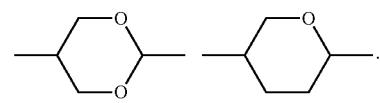

7. The liquid crystal composition of claim 6, wherein the fourth component is at least one compound selected from the group consisting of compounds represented by Chemical Formulae 4-1 and 4-6:

Chemical Formula 4-1

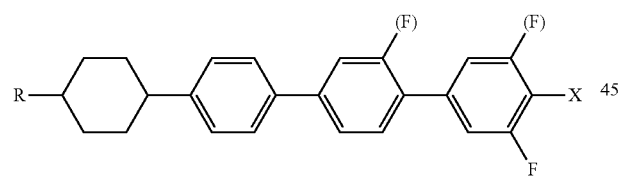

Chemical Formula 4-2

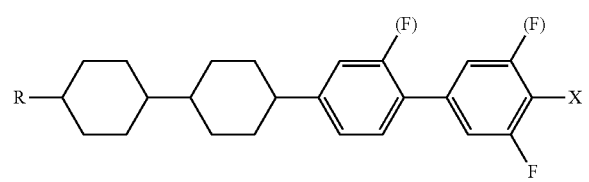

Chemical Formula 4-3

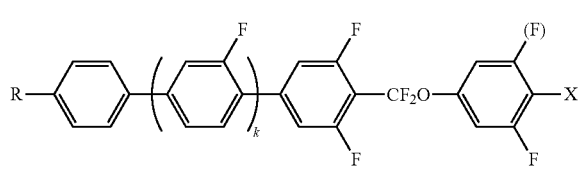

Chemical Formula 4-4

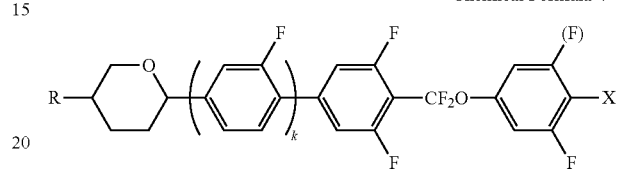

Chemical Formula 4-5

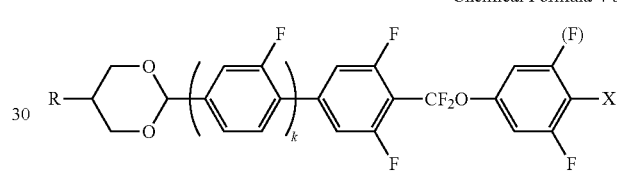

Chemical Formula 4-6

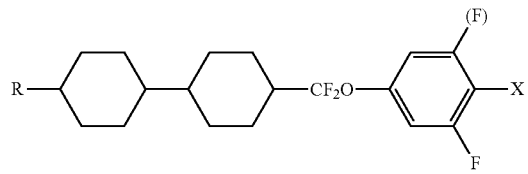

wherein, R and X are same as claim 1, and k is 0 or 1.

8. The liquid crystal composition of claim 7, wherein the fourth component is at least one compound selected from the group consisting of compounds represented by Chemical Formulae 4-2 and 4-3.

9. The liquid crystal composition of claim 6, wherein the fourth component is in amount of 3 wt % to 70 wt %.

10. The liquid crystal composition of claim 1, further comprising a compound represented by Chemical Formula 5, as a fifth component:

Chemical Formula 5

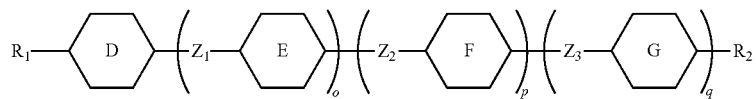

wherein $R_1$ and $R_2$ are independently of each other alkyl having 1 to 12 carbon atoms, alkenyl having 2 to 12 carbon atoms and alkoxy having 1 to 12 carbon atoms; $Z_1$, $Z_2$ and $Z_3$ are independently of each other a single bond, $CF_2O$, $CH_2CH_2$, COO or $CF_2CF_2$, o, p and q are independently of each other integer of 0 to 2 and hexacycles D, E, F and G are independently of each other following groups:

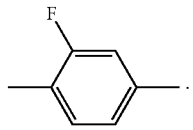

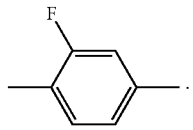

11. The liquid crystal composition of claim 10, wherein the fifth component is at least one compound selected from the group consisting of compounds represented by Chemical Formulae 5-1 to 5-5:

Chemical Formula 5-1

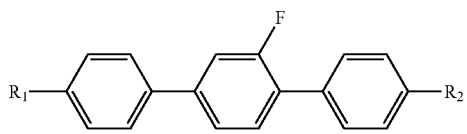

Chemical Formula 5-2

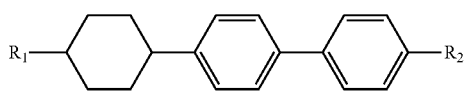

Chemical Formula 5-3

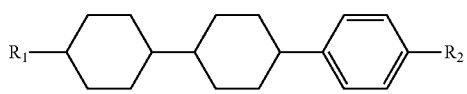

Chemical Formula 5-4

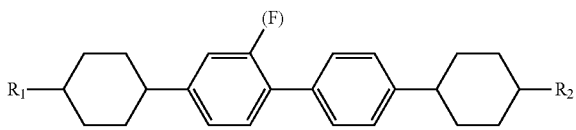

Chemical Formula 5-5

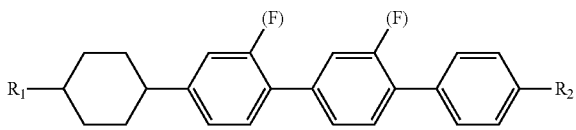

wherein $R_1$ and $R_2$ are independently of each other alkyl having 1 to 12 carbon atoms, alkenyl having 2 to 12 carbon atoms or alkoxy having 1 to 12 carbon atoms.

12. The liquid crystal composition of claim 11, wherein the fifth component is at least one compound selected from the group consisting of compounds represented by Chemical Formulae 5-1 to 5-3.

13. The liquid crystal composition of claim 10, wherein the fifth component is in amount of 3 wt % to 70 wt %.

14. The liquid crystal composition of claim 10, further comprising at least one compound selected from the group consisting of compounds represented by Chemical Formulae 6 to 8, in amount of 0 to 2000 ppm, respectively;

Chemical Formula 6

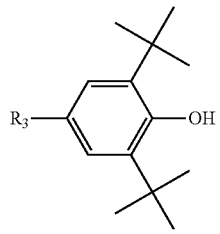

Chemical Formula 7

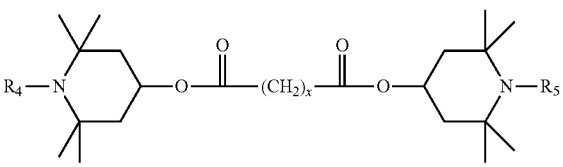

Chemical Formula 8

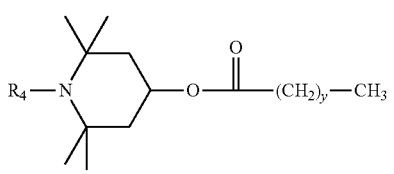

wherein $R_3$ to $R_5$ are independently of each other hydrogen or alkyl having 1 to 12 carbon atoms, x is 1 to 12 and y is 0 to 12.

15. The liquid crystal composition of claim 14, of which a nematic maximum temperature is at least 70° C., a refractive index anisotropy at 20° C. and 589 nm is at least 0.08, and a dielectric anisotropy is at least 2.

16. The liquid crystal composition of claim 2, wherein the first component is in amount of 3 wt % to 30 wt %, the second component is in amount of 10 wt % to 80 wt, and the third component is in amount of 3 wt % to 80 wt %, based on total weight of the liquid crystal composition.

17. The liquid crystal composition of claim 2, wherein the first component is in amount of 3 wt % to 10 wt %, the second component is in amount of 10 wt % to 80 wt, the third component is in amount of 3 wt % to 80 wt %, and total weight of the first component and the third component is 50 wt % to 90 wt %, based on total weight of the liquid crystal composition.

18. The liquid crystal composition of claim 2, further comprising a compound represented by Chemical Formula 4, as a fourth component:

Chemical Formula 4

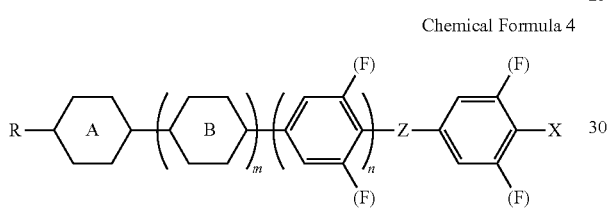

wherein R and X are same as claim 1; Z is a single bond, $CF_2O$, $CH_2CH_2$, COO or $CF_2CF_2$, when Z is a single bond, and m=1, n is not 0, and m+n≤3, and when Z is not a single bond, m and n are 0 or 1, respectively, and m+n≠0; hexacycles A and B are independently of each other following groups:

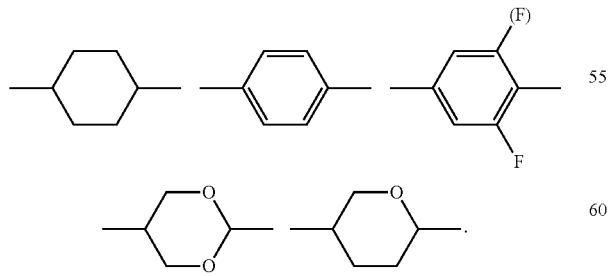

19. The liquid crystal composition of claim 3, further comprising a compound represented by Chemical Formula 4, as a fourth component:

Chemical Formula 4

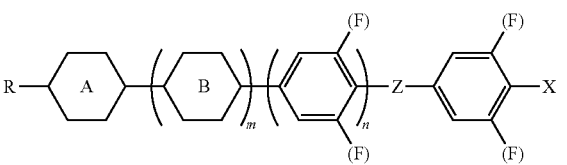

wherein R and X are same as claim 1; Z is a single bond, $CF_2O$, $CH_2CH_2$, COO or $CF_2CF_2$, when Z is a single bond, and m=1, n is not 0, and m+n≤3, and when Z is not a single bond, m and n are 0 or 1, respectively, and m+n≠0; hexacycles A and B are independently of each other following groups:

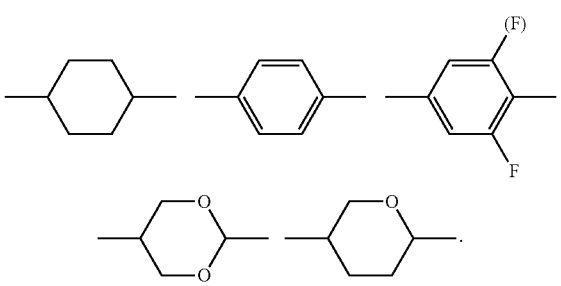

20. The liquid crystal composition of claim 2, further comprising a compound represented by Chemical Formula 5, as a fifth component:

Chemical Formula 5

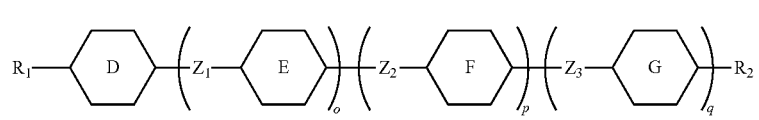

wherein $R_1$ and $R_2$ are independently of each other alkyl having 1 to 12 carbon atoms, alkenyl having 2 to 12 carbon atoms and alkoxy having 1 to 12 carbon atoms; $Z_1$, $Z_2$ and $Z_3$ are independently of each other a single bond, $CF_2O$, $CH_2CH_2$, COO or $CF_2CF_2$, o, p and q are independently of each other integer of 0 to 2 and hexacycles D, E, F and G are independently of each other following groups:

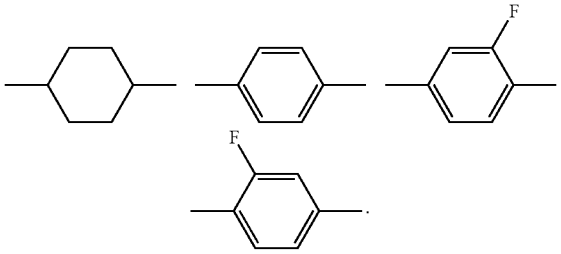

* * * * *